(12) United States Patent
Hoshi et al.

(10) Patent No.: US 12,438,431 B2
(45) Date of Patent: Oct. 7, 2025

(54) ELECTROMAGNETIC ACTUATOR DEVICE AND SUSPENSION DEVICE PROVIDED WITH SAME

(71) Applicant: Hitachi Astemo, Ltd., Hitachinaka (JP)

(72) Inventors: Ryosuke Hoshi, Tokyo (JP); Yasuaki Aoyama, Tokyo (JP); Nobuyuki Ichimaru, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 196 days.

(21) Appl. No.: 18/269,651

(22) PCT Filed: Oct. 15, 2021

(86) PCT No.: PCT/JP2021/038197
§ 371 (c)(1),
(2) Date: Jun. 26, 2023

(87) PCT Pub. No.: WO2022/163029
PCT Pub. Date: Aug. 4, 2022

(65) Prior Publication Data
US 2024/0063704 A1 Feb. 22, 2024

(30) Foreign Application Priority Data
Jan. 26, 2021 (JP) ................. 2021-010173

(51) Int. Cl.
*H02K 41/03* (2006.01)
*B60G 17/015* (2006.01)
*H02K 11/21* (2016.01)

(52) U.S. Cl.
CPC ......... *H02K 41/031* (2013.01); *B60G 17/015* (2013.01); *H02K 11/21* (2016.01)

(58) Field of Classification Search
CPC .. H02K 41/031; H02K 11/21; H02K 2213/03; H02K 11/215; H02K 29/08;
(Continued)

(56) References Cited

U.S. PATENT DOCUMENTS

| | | | | |
|---|---|---|---|---|
| 4,663,551 A | * | 5/1987 | Weh | ............ H02K 41/031 310/152 |
| 4,912,746 A | * | 3/1990 | Oishi | ............ H02K 41/031 310/12.01 |

(Continued)

FOREIGN PATENT DOCUMENTS

| | | | |
|---|---|---|---|
| JP | 2011-166880 A | 8/2011 | |
| JP | 2016092842 A | * 5/2016 | ........... H02K 41/031 |

(Continued)

OTHER PUBLICATIONS

Korean Office Action issued on Oct. 18, 2024 for Korean Patent Application No. 10-2023-7022806.

(Continued)

*Primary Examiner* — Mohamad A Musleh
(74) *Attorney, Agent, or Firm* — Volpe Koenig (57) ABSTRACT

An electromagnetic actuator device reduces pulsation and improves thrust, and includes: a magnet; and an armature that moves relative to the magnet. The armature includes: a plurality of teeth formed in a relative movement direction; a plurality of slots between the plurality of teeth; a yoke connecting the plurality of teeth; and a winding around the plurality of slots. The magnet includes a plurality of magnet portions facing the plurality of teeth via a gap and are disposed in the relative movement direction. A relationship between a minimum sectional area Sc1 of one tooth end portion of the armature and a minimum sectional area Sc2 of the other tooth end portion is Sc1>Sc2; and a relationship between the minimum sectional area Sc2 of the other tooth (Continued)

end portion and a sectional area Sy of the yoke in a direction crossing the relative movement direction is $Sc2 \geq Sy$.

9 Claims, 6 Drawing Sheets

(58) Field of Classification Search
CPC ............ B60G 17/015; B60G 2202/422; B60G 2401/172; F16F 15/03
See application file for complete search history.

(56) References Cited

U.S. PATENT DOCUMENTS

| | | | |
|---|---|---|---|
| 2004/0217659 A1* | 11/2004 | Godkin | H02K 41/03 310/12.25 |
| 2016/0126820 A1 | 5/2016 | Maeda | |
| 2017/0054354 A1 | 2/2017 | Misawa et al. | |

FOREIGN PATENT DOCUMENTS

| | | | | |
|---|---|---|---|---|
| JP | 2016-163407 A | 9/2016 | | |
| JP | 5987038 B2 * | 9/2016 | ........... | H02K 41/031 |
| JP | 2017-041947 A | 2/2017 | | |

OTHER PUBLICATIONS

International Search Report, PCT/JP2021/038197, Dec. 14, 2021, 2 pgs.

\* cited by examiner

ELECTROMAGNETIC ACTUATOR DEVICE AND SUSPENSION DEVICE PROVIDED WITH SAME

TECHNICAL FIELD

The present invention relates to an electromagnetic actuator device using a linear motor and a suspension device provided with the same.

BACKGROUND ART

In a linear motor, amounts of magnetic flux interlinking with each winding are unbalanced due to the presence of end portions, and thrust pulsation occur. In order to reduce the pulsation, a method of changing the number of windings of a phase that is affected by the end portions to be different from those of the other phases, a method of changing the shape of teeth, and the like are known. Examples of these methods include PTL 1.

According to the technique described in PTL 1, pulsation is reduced by reducing the sectional area of teeth located at one end portion with respect to the sectional area of teeth located at the other end portions.

CITATION LIST

Patent Literature

PTL 1: JP 2016-92842 A

SUMMARY OF INVENTION

Technical Problem

However, the technique described in PTL 1 has a problem that imbalance of magnetic flux interlinking across each winding occurs due to magnetic saturation and thrust pulsation increases in a case where the sectional area of the teeth located at the end portion is excessively reduced. Also, there is a problem that a high likelihood of magnetic saturation leads to an increase in leakage magnetic flux and magnetic flux contributing to thrust decreases.

An object of the present invention is to provide an electromagnetic actuator device using a linear motor and a suspension device provided with the same capable of reducing pulsation and improving thrust.

Solution to Problem

In order to achieve the above object, the present invention is characterized by an electromagnetic actuator device including: a magnet portion; and an armature that moves relative to the magnet portion, in which the armature includes a plurality of teeth formed in a relative movement direction, a plurality of slots formed between the plurality of teeth, a yoke that connects the plurality of teeth, and a winding wound around the plurality of slots, the magnet portion includes a plurality of magnets that face the plurality of teeth via an air gap and are disposed in the relative movement direction, a relationship between a minimum sectional area Sc of one of tooth end portions of the armature and a minimum sectional area Sc2 of the other tooth end portion is Sc1>Sc2, and a relationship between the minimum sectional area Sc2 of the other tooth end portion and a sectional area Sy of the yoke in a direction crossing the relative movement direction is Sc2≥Sy.

Advantageous Effects of Invention

According to the present invention, it is possible to provide an electromagnetic actuator device and a suspension device provided with the same in which thrust pulsation is small and thrust is large. Problems, configurations, and effects other than those described above will be clarified by the following description of embodiments.

DESCRIPTION OF EMBODIMENTS

Hereinafter, embodiments of the present invention will be described with reference to the accompanying drawings. Similar components will be denoted by similar reference signs, and similar explanation will not be repeated.

Various components according to the present invention are not necessarily components that are individually independently present, and one component configured of a plurality of members, a plurality of components configured of one member, a certain component configuring a part of another component, a part of a certain component overlapping a part of another component, and the like are allowed.

First Embodiment

An electromagnetic actuator device according to the present invention will be described using FIGS. 1 to 3. In a first embodiment, an armature 10 and a magnet portion 20 move relative to each other. In the first embodiment, a direction of the relative movement is defined as a Z direction, and two directions perpendicularly intersecting the Z direction are defined as an X direction and a Y direction.

Figure 1A:
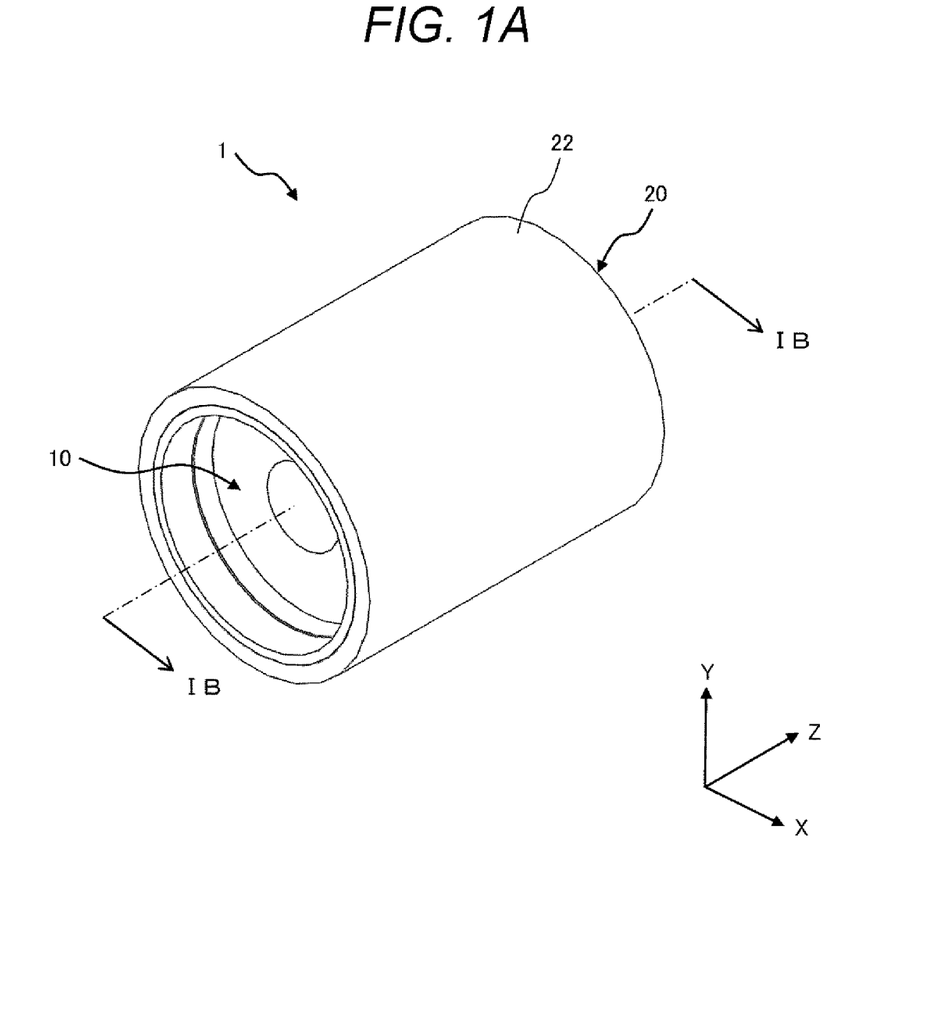
FIG. 1A is an external perspective view of a linear motor portion taken out of an electromagnetic actuator device.
Figure 1B:
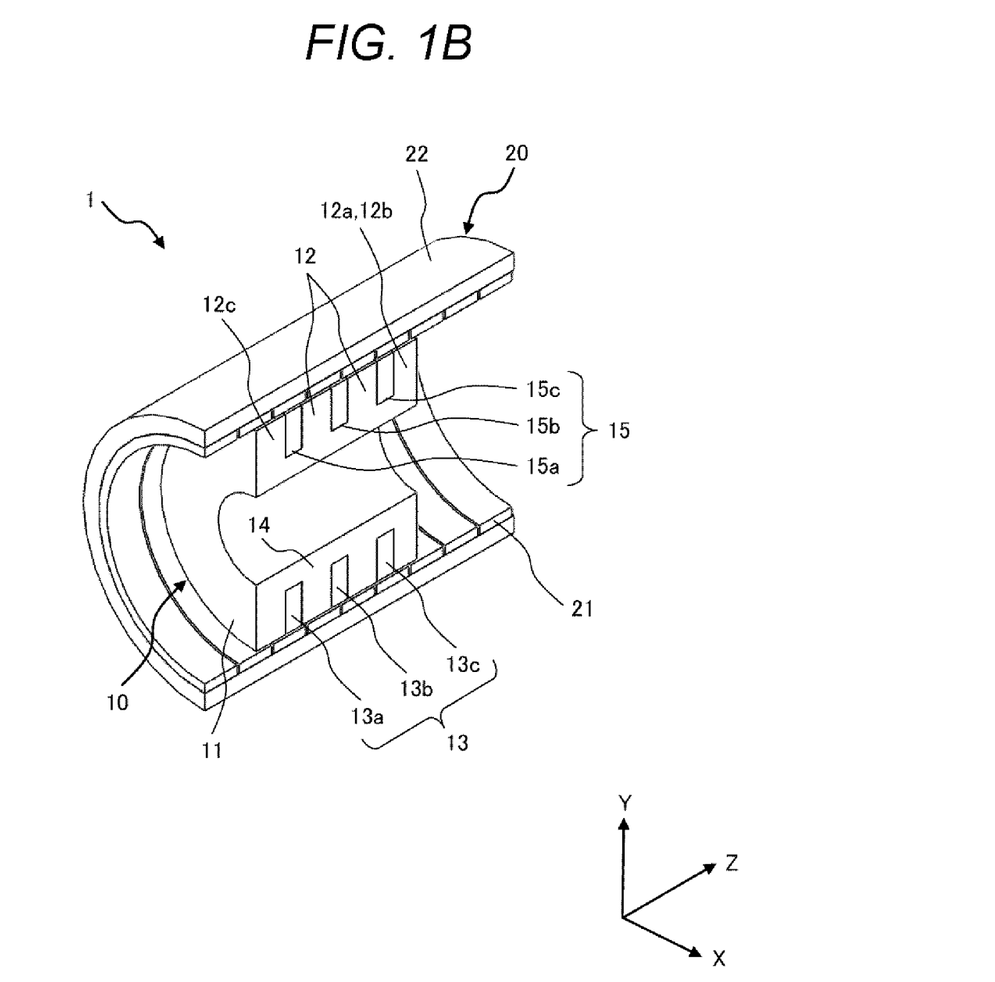
FIG. 1B is a sectional view of FIG. 1A cut along the line IB-IB (YZ plane).

FIG. 1A is an external perspective view of a linear motor portion taken out from the electromagnetic actuator device, and FIG. 1B is a sectional view of FIG. 1A cut along the line IB-IB (YZ plane).

FIGS. 1A and 1B illustrate main components of the linear motor and do not illustrate other mechanical parts of the electromagnetic actuator device. In FIGS. 1A and 1B, a linear motor 1 includes a magnet portion 20 and an armature 10 that moves relative to the magnet portion 20.

The armature 10 includes a plurality of teeth 12 formed in the Z direction (relative movement direction), a plurality of slots 15 formed between the plurality of teeth 12, a yoke 14 that connects the plurality of teeth 12, and a winding 13 wound around the plurality of slots. The plurality of slots 15 are configured of a U-phase slot 15a, a V-phase slot 15b, and a W-phase slot 15c.

The magnet portion 20 includes a magnetic body 22 (outer tube) formed into a tubular shape and a plurality of magnets 21 that are disposed on the side of the inner circumference of the magnetic body 22, face the plurality of teeth 12 via an air gap, and are disposed in the Z direction (relative movement direction). Also, the armature 10 is disposed on the side of the inner circumference of the magnet portion 20 formed into the tubular shape.

The magnet portion 20 and the armature 10 move relative to each other in the Z direction and cause a force in the Z direction, that is, thrust.

The configuration of this linear motor has a four-pole three-slot structure in which three windings 13 are disposed at the magnetic body 11 of the armature 10 configuring the teeth with respect to four magnets. This is an example of the configuration of the linear motor, and the present invention is not limited to this configuration as long as similar effects are obtained. For example, the present invention is not limited to the number of poles, the number of slots, and the linear motor with a cylindrical shape.

The linear motor illustrated in FIG. 1 is an example of a three-phase linear motor that applies three-phase alternating current to the three windings 13 (13a, 13b, and 13c) and can cause an arbitrary force at an arbitrary position by varying the current values for the three windings 13. Thrust is caused by an interaction between a magnetic flux caused by the magnets 21 and a magnetic flux caused by the windings 13. The linear motor has end portions at the armature, unlike a rotary machine. It is known that secondary thrust pulsation occurs in the linear motor due to influences of the end portions. This is caused by imbalance of interlinking magnetic flux among the three phases due to the end portions.

Figure 2A:
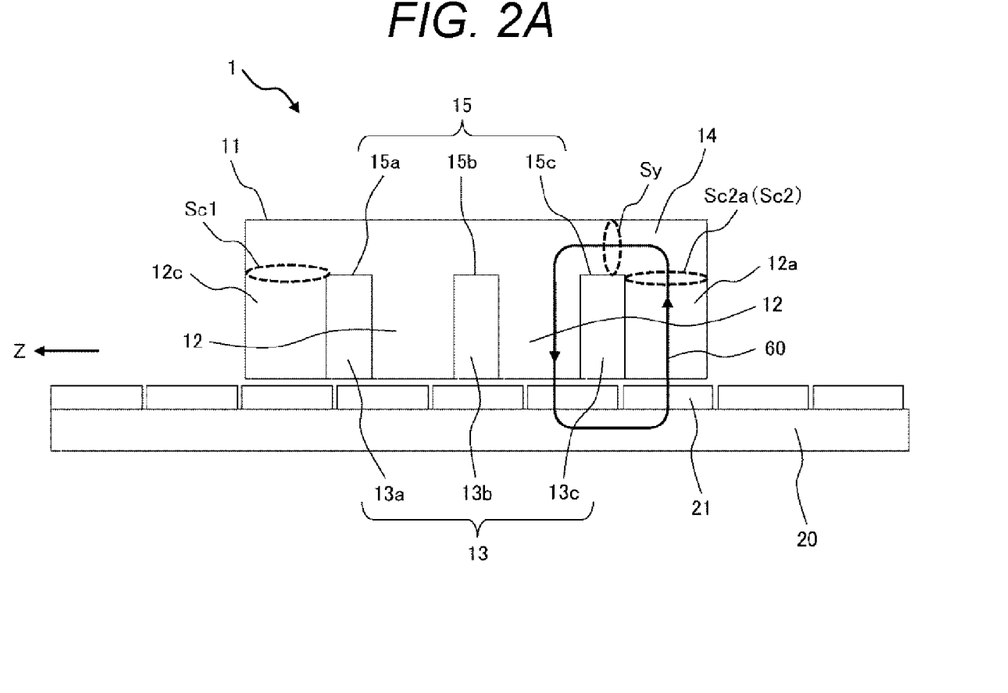
FIG. 2A is a sectional view illustrating a structure in the related art.
Figure 2B:
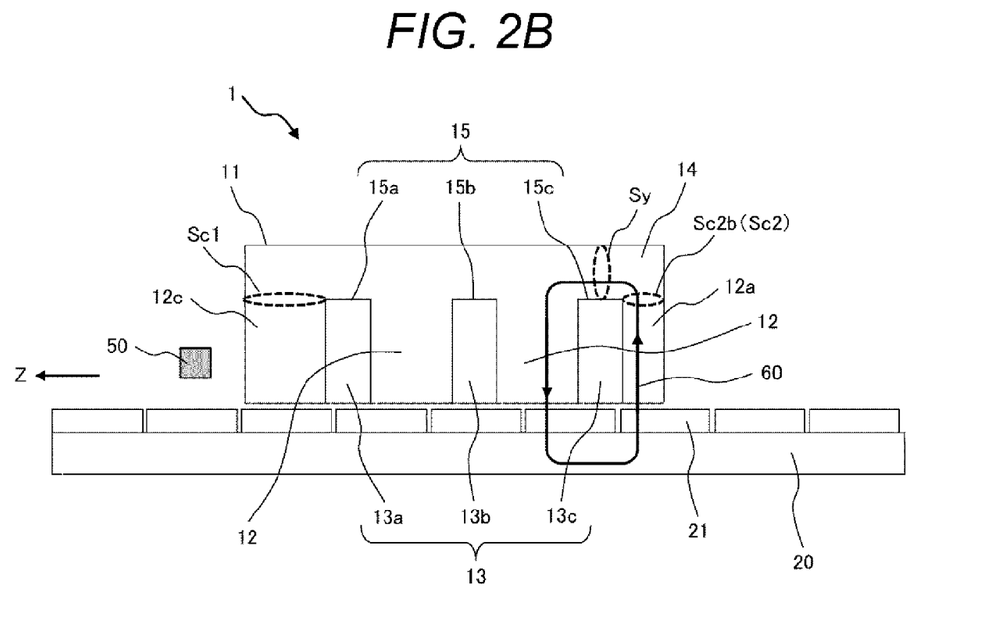
FIG. 2B is a sectional view illustrating a structure of a linear motor according to a first embodiment of the present invention.

FIG. 2 is a comparative sectional view of two linear motors having tooth end portions with different dimensions. FIG. 2A is a sectional view illustrating a structure in the related art. Sc2a denotes a minimum sectional area of a tooth end portion 12a, Sc1 denotes a minimum sectional area of a tooth end portion 12c, and Sy denotes a sectional area of the yoke 14. In the first embodiment, the sectional area of the yoke 14 has a donut shape with a center portion hollowed out. A magnetic flux 60 passes through the tooth end portion and the yoke. In FIG. 2A, the minimum sectional area Sc2a of the tooth end portion 12a and the minimum sectional area Sc1 of the tooth end portion 12c have a relationship of equality (Sc2a=Sc1).

FIG. 2B is a sectional view illustrating a structure of the linear motor according to the first embodiment of the present invention, in which a minimum sectional area Sc2b of a tooth end portion 12b is smaller than a minimum sectional area Sc1 of a tooth end portion 12c (Sc2b<Sc1). Since the linear motor according to the present embodiment has a cylindrical shape, the sectional areas of the tooth end portions 12a, 12b, and 12c are not constant, and the sectional areas decrease toward the inner diameter. Therefore, comparison is made by using the sectional area of the tooth end portion located at the bottom portion (the side closest to the inner diameter side) of the slot in the first embodiment.

Figure 3:
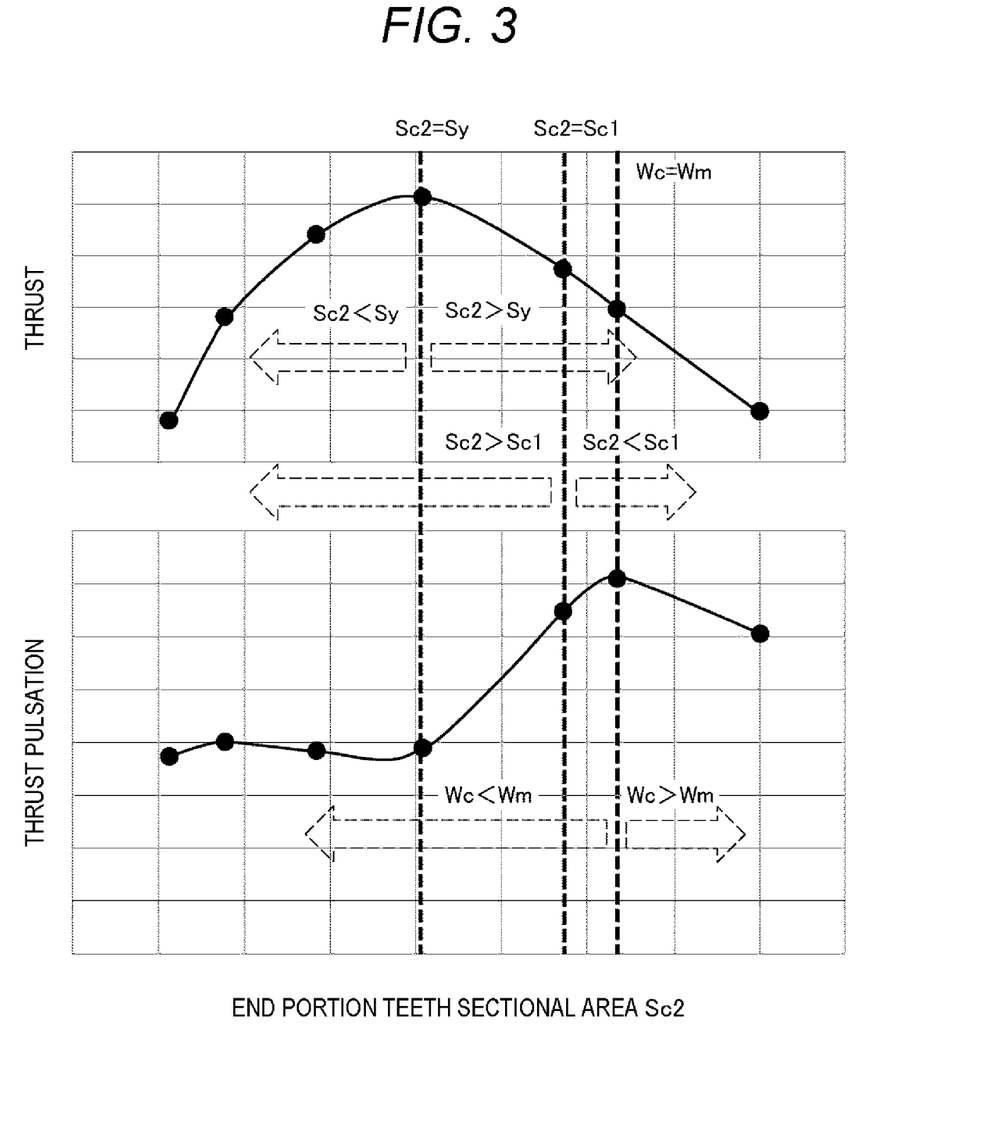
FIG. 3 is a diagram illustrating thrust and thrust pulsation properties with respect to a sectional area of one of end portions.

FIG. 3 is a diagram illustrating properties of thrust and thrust pulsation with respect to the sectional area of one of the end portions. The upper diagram in FIG. 3 illustrates a property of thrust, and the lower diagram in FIG. 3 illustrates a property of thrust pulsation. In FIG. 3, the left side of the drawing from Sc2=Sy as a boundary corresponds to Sc2<Sy, while the right side corresponds to Sc2>Sy. Also, the left side of the drawing from Sc2=Sc1 as a boundary corresponds to Sc2>Sc1, while the right side corresponds to Sc2<Sc1.

If the minimum sectional area Sc2 of the one of the tooth end portions is reduced from a state where the minimum sectional areas Sc2 and Sc1 of the tooth end portions are equal to each other (Sc2=Sc1) in the linear motor, thrust increases, reaches the maximum value at the point where the minimum sectional area Sc2 of the tooth end portion and the sectional area Sy of the yoke become equal to each other (Sc2=Sy), and then decreases.

If the minimum sectional area Sc2 of the one of the tooth end portions is reduced from the state where the minimum sectional areas Sc2 and Sc1 of the tooth end portions are equal to each other (Sc2=Sc1) in the linear motor, thrust pulsation suddenly decreases until the point where the minimum sectional area Sc2 of the tooth end portion and the sectional area Sy of the yoke become equal to each other (Sc2=Sy).

When the minimum sectional area Sc2 of the tooth end portion is smaller than the sectional area Sy of the yoke (Sc2<Sy), the tooth end portion is magnetically saturated earlier than the yoke, and influences of the end portion on pulsation are thus small, while thrust significantly decreases. At this time, the relationship between the minimum sectional areas Sc2 and Sc1 of the tooth end portions is Sc2>Sc1.

When the minimum sectional area Sc2 of the one of the tooth end portions is reduced, and the minimum sectional area Sc2 of the tooth end portion becomes equal to the sectional area Sy of the yoke (Sc2=Sy), the magnetic flux 60 passes through the tooth end portion and the yoke, and uniform magnetic flux density is thus obtained inside the tooth end portion and inside the yoke. Therefore, neither the yoke nor the tooth end portion is magnetically saturated earlier, and it is possible to reduce the minimum sectional area of the tooth end portion without adversely affecting thrust and thereby to reduce thrust pulsation.

When the minimum sectional area Sc2 of the tooth end portion is larger than the sectional area Sy of the yoke (Sc2>Sy), thrust decreases, and thrust pulsation increases first as Sc2 increases, reaches its maximum value, and starts to decrease. When the minimum sectional area of the tooth end portion increases, the dimension of the surface of the tooth end portion facing the magnets in the Z-axis direction increases. In this manner, since the section where a tooth extends across two magnets is extended, and a loop is depicted between the tooth tip and the magnets, a magnetic flux effective for thrust decreases, and pulsation also decreases.

On the basis of the above description, it is preferable to set the relationship between the minimum sectional area Sc1 of one of the tooth end portions of the armature 10 and the minimum sectional area Sc2 of the other tooth end portion to Sc1>Sc2 and to set the relationship between the minimum sectional area Sc2 of the other tooth end portion and the sectional area Sy of the yoke in the direction crossing the relative movement direction to Sc2 Sy in order to curb a decrease in thrust and reduce pulsation, based on the state where the minimum sectional areas Sc2 and Sc1 of the tooth end portions are equal to each other (Sc2=Sc1) in the linear motor.

Additionally, it is desirable to place the sensor 50 configured to detect the magnetic pole position of the armature on the side of the tooth end portion 12c with a large minimum sectional area as illustrated in FIG. 2B when the sensor 50 is placed by using the magnetic flux of the magnets in the Z-axis direction with respect to the armature in the linear motor in FIG. 2B. If the sensor 50 is placed on the tooth end portion 12b, there is a likelihood of a leakage magnetic flux occurring due to magnetic saturation in the case of driving with a large current and of reliability of detection of the magnetic pole position being degraded. Therefore, it is possible to secure the reliability of the magnetic pole position detection by installing the sensor 50 on the side of the tooth end portion 12c which is unlikely to be magnetically saturated.

According to the first embodiment, it is possible to provide an electromagnetic actuator device that is designed to curb thrust pulsation and improve thrust.

Second Embodiment

Next, a second embodiment of the present invention will be described using FIGS. 3 and 4. The same components as those of the first embodiment will be denoted by the same reference numerals, and the detailed description thereof will be omitted.

In FIG. 3, the point where thrust pulsation reaches its maximum value is a point when a dimension Wc of the surface of the tooth end portion 12b facing the magnets in the Z-axis direction and a dimension Wm of the surfaces of the magnets 21 facing the tooth end portion 12b in the Z-axis direction are equal to each other (Wc=Wm).

Also, the left side of the drawing from Wc=Wm as a boundary corresponds to Wc<Wm, while the right side corresponds to Wc>Wm. Also, the left side of the drawing from Sc2=Sc1 as a boundary corresponds to Sc2>Sc1, while the right side corresponds to Sc2<Sc1.

Figure 4A:
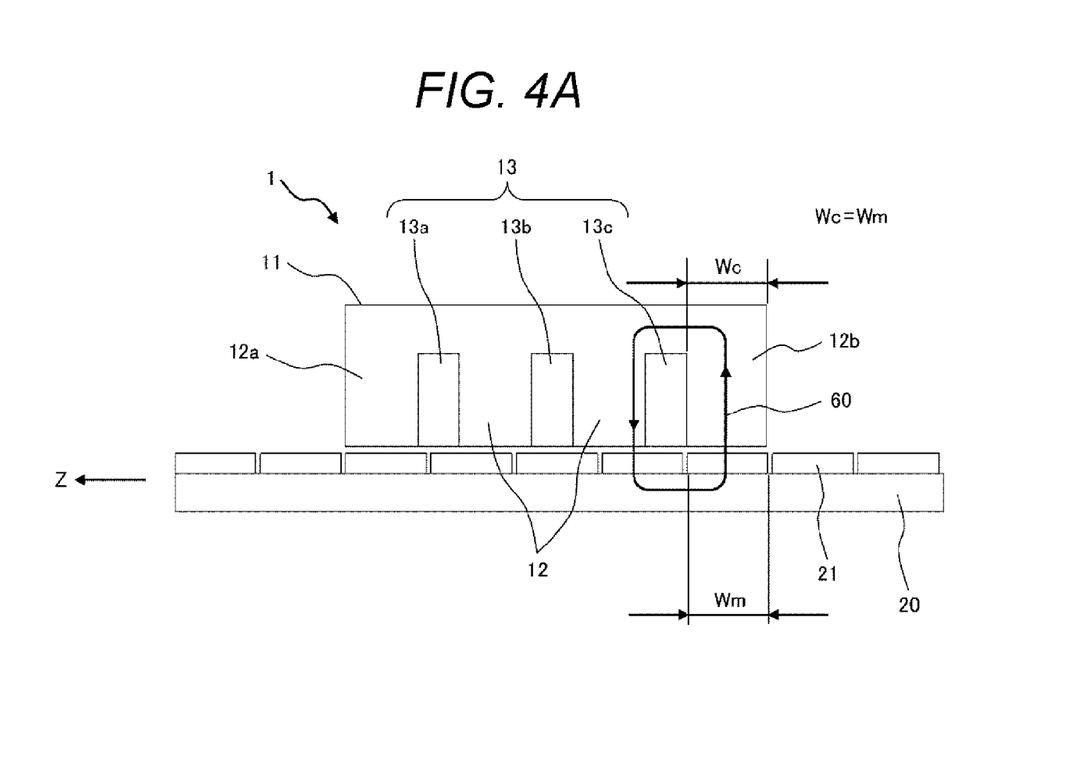
FIG. 4A is a sectional view illustrating a structure of the linear motor in a state where Wc and Wm are equal to each other (Wc=Wm).

FIG. 4A is a sectional view illustrating a structure of a linear motor in a state where Wc and Wm are equal to each other (Wc=Wm). When Wc=Wm as illustrated in FIG. 4A, the magnet 21 and the tooth end portion 12b completely face each other at a predetermined timing, a magnetic flux leaking to the space is thus minimized, and the magnetic flux 60 entering the teeth is maximized. In this manner, imbalance of the magnetic flux among the three phases increases, and thrust pulsation reaches its maximum value as illustrated in FIG. 3.

Figure 4B:
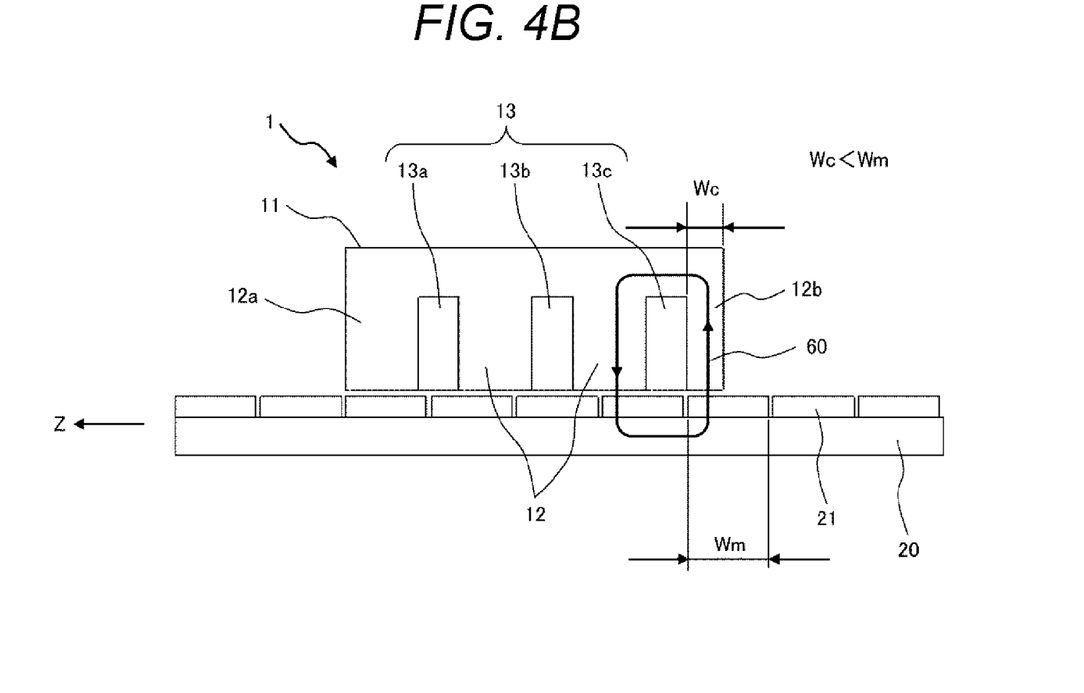
FIG. 4B is a sectional view illustrating a structure of a linear motor in a state where Wc is smaller than Wm (Wc<Wm) according to a second embodiment of the present invention.

FIG. 4B is a sectional view illustrating a structure of the linear motor in a state where Wc is smaller than Wm (Wc<Wm) according to a second embodiment of the present invention. When Wc<Wm as illustrated in FIG. 4B, the facing area of the tooth end portion 12b is small, and the magnetic flux of the magnets entering the tooth end portion 12b thus decreases. At this time, the magnetic flux of the magnets entering the tooth end portion 12b is smaller than that when Wc=Wm in FIG. 4A. In this manner, imbalance of the magnetic flux among the three phases decreases, thrust pulsation decreases, and thrust increases as illustrated in FIG. 3.

Figure 4C:
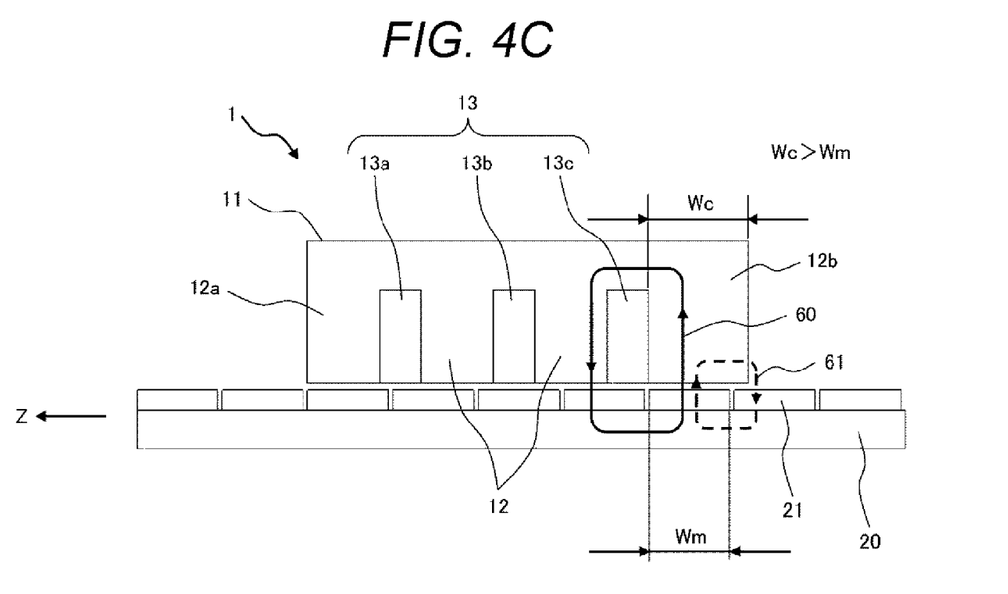
FIG. 4C is a sectional view illustrating a structure of the linear motor in a state where Wc is larger than Wm (Wc>Wm) according to the second embodiment of the present invention.

FIG. 4C is a sectional view illustrating a structure of the linear motor in a state where Wc is larger than Wm (Wc>Wm) according to the second embodiment of the present invention. When Wc>Wm as illustrated in FIG. 4C, the tooth end portion 12b faces the two adjacent magnets 21 as described above in the first embodiment, a leakage magnetic flux 61 caused because the magnetic flux 60 passing through the adjacent teeth via the yoke decreases and enters the adjacent magnet 21 via the tip of the tooth end portion 12b increases, and imbalance of the amount of magnetic flux among the three phases due to the end portion is thus improved, while thrust decreases due to the increase in leakage magnetic flux 61.

On the basis of the above description, it is desirable that Wm≠Wc (Wc<Wm or Wc>Wm) in order to reduce pulsation. Note that, in a case where there is a restriction in regard to the dimensions, it is possible to reduce the dimension of the tooth end portion in the Z-axis direction and to secure a stroke by setting Wc<Wm and setting the relationship between the minimum sectional area Sc2 of the tooth end portion 12b and the sectional area Sy of the yoke to Sc2>Sy since it is possible to secure a stroke when the dimension of the armature in the Z-axis direction is small.

Third Embodiment

Figure 5:
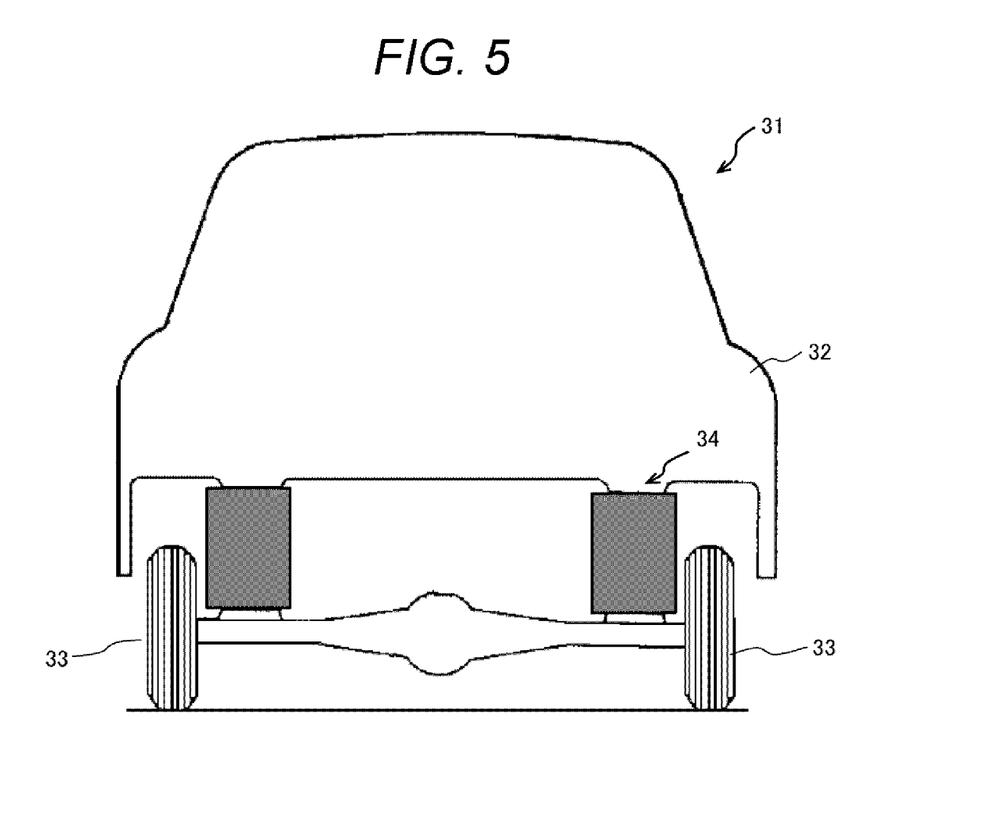
FIG. 5 is a configuration diagram of a vehicle suspension device using an electromagnetic actuator device according to a third embodiment of the present invention.

Next, a third embodiment of the present invention will be described using FIG. 5. FIG. 5 is a configuration diagram of a vehicle suspension device using an electromagnetic actuator device according to the third embodiment of the present invention.

In the third embodiment, a case where a vehicle suspension device is mounted in a vehicle such as a four-wheeled vehicle will be described as an example.

A vehicle body 32 configures a body of a vehicle 31. A total of four wheels 33 including left and right front wheels and left and right rear wheels are provided below the vehicle body 32. In the third embodiment, four suspension devices 34 provided between the vehicle body 32 and each of the wheels 33 are included in order to reduce vibration during travel. The suspension devices 34 according to the third embodiment are electromagnetic suspension devices using the electromagnetic actuator devices according to the present invention. Although not illustrated in the drawing, a power source configured to supply a current to the electromagnetic actuators and a controller capable of varying an electromagnetic force by controlling the current are connected to the suspension devices 34. The suspension devices 34 reduce vibration applied directly to the vehicle body using the electromagnetic force generated by linear motors.

In the third embodiment, it is possible to curb an increase in size of the linear motors configuring the suspension devices 34. Additionally, it is possible to reduce the mounting space for the suspension devices 34 in the vehicle 31 and thereby to save space for mounting machines related to travel.

Note that the present invention is not limited to the aforementioned embodiments and various modifications are included. The aforementioned embodiments have been described in detail in order to explain the present invention in a simple manner, and the present invention is not necessarily limited to embodiments including all the described configurations.

REFERENCE SIGNS LIST 1 linear motor
10 armature
11 magnetic body
12 tooth
12a, 12b, 12c tooth end portion 13 winding
14 yoke
15 slot
15a U-phase slot
15b V-phase Slot
15c W-phase slot
20 magnet portion
21 magnet
22 magnetic body
31 vehicle
32 vehicle body
33 wheel
34 suspension device
50 sensor
60 magnetic flux
61 leakage magnetic flux

The invention claimed is:

1. An electromagnetic actuator device comprising:
a magnet portion;
an armature that moves relative to the magnet portion; and
a sensor that detects a magnetic pole position of the armature, wherein the sensor is disposed on a side of the one tooth end portion,
wherein the armature includes a plurality of teeth formed in a relative movement direction, a plurality of slots formed between the plurality of teeth, a yoke that connects the plurality of teeth, and a winding wound around the plurality of slots,
the magnet portion includes a plurality of magnets that face the plurality of teeth via an air gap and are disposed in the relative movement direction, and
a relationship between a minimum sectional area Sc1 of one tooth end portion of the armature and a minimum sectional area Sc2 of another tooth end portion is Sc1>Sc2, and a relationship between the minimum sectional area Sc2 of the other tooth end portion and a sectional area Sy of the yoke in a direction crossing the relative movement direction is Sc2≥Sy.

2. The electromagnetic actuator device according to claim 1, wherein a relationship between a dimension Wc of a surface of the other tooth end portion facing the magnets in the relative movement direction and a dimension Wm of surfaces of the magnets facing the other tooth end portion in the relative movement direction is Wc<Wm, and a relationship between the minimum sectional area Sc2 of the other tooth end portion and the sectional area Sy of the yoke is Sc2>Sy.

3. A suspension device comprising the electromagnetic actuator device according to claim 1.

4. An electromagnetic actuator device comprising:
a magnet portion; and
an armature that moves relative to the magnet portion, wherein the armature includes a plurality of teeth formed in a relative movement direction, a plurality of slots formed between the plurality of teeth, a yoke that connects the plurality of teeth, and a winding wound around the plurality of slots,
wherein:
the magnet portion includes a plurality of magnets that face the plurality of teeth via an air gap and are disposed in the relative movement direction, and
a relationship between a minimum sectional area Sc1 of one tooth end portion of the armature and a minimum sectional area Sc2 of another tooth end portion is Sc1>Sc2, and a relationship between the minimum sectional area Sc2 of the other tooth end portion and a sectional area Sy of the yoke in a direction crossing the relative movement direction is Sc2≥Sy,
the magnet portion is formed into a tubular portion, and
the armature is disposed on a side of an inner circumference of the magnet portion formed into the tubular shape.

5. The electromagnetic actuator device according to claim 4, comprising a sensor that detects a magnetic pole position of the armature,
wherein the sensor is disposed on a side of the one tooth end portion.

6. The electromagnetic actuator device according to claim 4, wherein the minimum sectional area Sc1 of the tooth end portion and the minimum sectional area Sc2 of the other tooth end portion are a sectional area of teeth located at bottom portions of the slots.

7. A suspension device comprising the electromagnetic actuator device according to claim 4.

8. An electromagnetic actuator device comprising:
a magnet portion; and
an armature that moves relative to the magnet portion, wherein the armature includes a plurality of teeth formed in a relative movement direction, a plurality of slots formed between the plurality of teeth, a yoke that connects the plurality of teeth, and a winding wound around the plurality of slots,
wherein:
the magnet portion includes a plurality of magnets that face the plurality of teeth via an air gap and are disposed in the relative movement direction, and
a relationship between a minimum sectional area Sc1 of one tooth end portion of the armature and a minimum sectional area Sc2 of another tooth end portion is Sc1>Sc2, and a relationship between the minimum sectional area Sc2 of the other tooth end portion and a sectional area Sy of the yoke in a direction crossing the relative movement direction is Sc2≥Sy, and
a relationship between a dimension Wc of a surface of the other tooth end portion facing the magnets in the relative movement direction and a dimension Wm of surfaces of the magnets facing the other tooth end portion in the relative movement direction is Wc≠Wm.

9. A suspension device comprising the electromagnetic actuator device according to claim 8.

* * * * *